United States Patent [19]

Cheng et al.

[11] 4,285,926

[45] Aug. 25, 1981

[54] START-UP OF CARBON BLACK PROCESS

[75] Inventors: Paul J. Cheng; King L. Mills, both of Bartlesville, Okla.

[73] Assignee: Phillips Petroleum Co., Bartlesville, Okla.

[21] Appl. No.: 89,420

[22] Filed: Oct. 30, 1979

[51] Int. Cl.$^3$ .......................... C01B 31/02; C09C 1/48
[52] U.S. Cl. ................................................... 423/450
[58] Field of Search ..................... 423/450; 422/150; 236/15 BF

[56] References Cited

U.S. PATENT DOCUMENTS

| | | | |
|---|---|---|---|
| 3,369,870 | 2/1968 | Ganz et al. | 423/456 |
| 4,069,298 | 1/1978 | Hunt | 423/456 |

*Primary Examiner*—O. R. Veritz
*Assistant Examiner*—Gregory A. Heller

[57] ABSTRACT

A start-up technique for a carbon black production process, in which carbon black laden effluent smoke from a carbon black furnace is quenched to terminate the reaction and cool said smoke and said smoke is thereafter cooled, at least in part, by indirect heat exchange with water, in which the smoke is initially quenched with a quench fluid to a temperature substantially below a predetermined temperature of introduction into the heat exchange step and the magnitude of the quenching is reduced over an extended period of time until the smoke is being quenched into a temperature substantially equal to the predetermined temperature.

14 Claims, 1 Drawing Figure

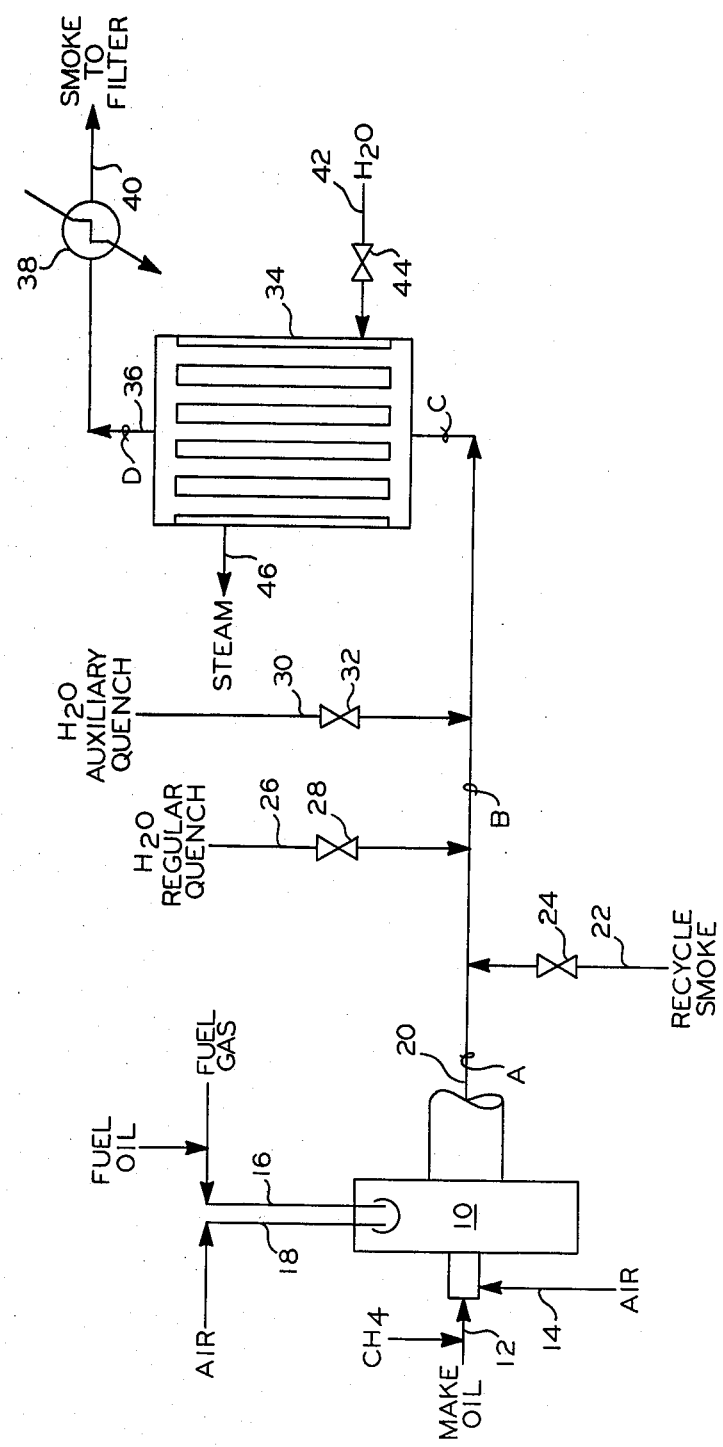

START-UP OF CARBON BLACK PROCESS

BACKGROUND OF THE INVENTION

The present invention relates to a method for starting up a carbon black process. More specifically the present invention relates to a method of starting up a carbon black process in which carbon black containing smoke from a furnace is cooled, at least in part, by indirect heat exchange.

In the production of carbon black, it is conventional to quench the effluent smoke coming from the carbon black furnace with a water spray in order to quickly lower the temperature of the smoke below the reaction temperature of the carbon black therein, and to reduce the smoke temperature below a temperature which would damage glass cloth or other fiber bags employed in a conventional bag filter to collect the carbon black. However, this conventional practice wastes considerable energy, requires excessive amounts of water and the off gas from the filter contains excessive amounts of moisture, thereby requiring some means of removing at least part of the moisture in order to utilize the off gas as an in-plant fuel or as a fuel for other purposes. Consequently, it has been proposed to utilize various other quench means and cooling techniques in combination with a water quench to quench and cool the smoke to an acceptable temperature for filtering. For example, a part of the smoke itself, a part of the off gas from the filter or other cool streams may be utilized as part of the quench, the smoke may be utilized to indirectly preheat air for the process and/or hydrocarbon feed for the process and/or the soke may be passed through a steam boiler to generate steam which can then be utilized as an in-plant power source to power steam engines, motors or turbines, to drive pumps or compressors and for other in-plant uses as well as for a source of energy for other processes. For example, in U.S. Pat. No. 3,369,870 it is proposed that a portion of the cooled smoke be recycled to serve as a preliminary quench medium, that the smoke be utilized to indirectly preheat process air and hydrocarbon feed, that the preliminarily cooled smoke then be passed through the tubes of a tube and shell steam boiler to generate in-plant steam and finally that a water spray be utilized simply as a temperature trimming technique to cool the smoke to a suitable temperature for filtering. It is the utilization of a steam boiler as a means for, at least in part, cooling smoke from a carbon black furnace and to generate steam to which the present invention is primarily directed.

While this technique of utilizing a steam boiler to provide at least a part of the cooling for the carbon black smoke is advantageous, it has been found in accordance with the present invention that relatively poor heat transfer occurs between the smoke and the water.

It is therefore an object of the present invention to provide an improved technique for cooling smoke from a carbon black process.

Another object of the present invention is to provide an improved start-up procedure for a carbon black process.

A further object of the present invention is to provide an improved process for at least partially cooling carbon black smoke by indirect heat exchange.

Another and further object of the present invention is to provide an improved technique for at least partially cooling carbon black smoke by indirect heat exchange wherein heat transfer is significantly improved.

These and other objects of the present invention will be apparent from the following description.

BRIEF DESCRIPTION OF THE DRAWING

The drawing schematically illustrates equipment and a process flow which may be utilized to carry out the present invention.

SUMMARY OF THE INVENTION

A method for starting up a carbon black production process, in which smoke produced by a carbon black furnace is quenched to terminate the reaction and is thereafter cooled, at least in part, by indirect heat exchange with water, in which the smoke is initially quenched to a temperature substantially below a predetermined temperature of introduction into the heat exchange step and the magnitude of the quenching is reduced over an extended period of time until the smoke is being quenched to a temperature substantially equal to the predetermined temperature.

DESCRIPTION OF THE PREFERRED EMBODIMENTS

In accordance with the present invention it has been discovered that a relatively poor heat transfer coefficient exists through the heat transfer surfaces of an indirect heat exchange system utilized to, at least partially, cool effluent smoke from a carbon black furnace. While it is not intended to be limited to any particular theory, it is believed that this poor heat transfer results from the thermal gradient between the flowing smoke stream and the heat exchange surfaces of the indirect heat exchanger, creating a thermal force (thermophoresis) urging particulate materials to deposit on the heat exchange surfaces. The result of this is a lowering of the heat transfer rate. The larger the thermal gradient the faster the deposit forms and the more firm the particulate deposit becomes. Consequently, in accordance with the present invention a technique is provided to minimize such deposition of particulate materials on heat exchange surfaces and maximize the heat transfer rate through the transfer surfaces.

Indirect heat exchangers, particularly steam boiler type heat exchangers, are designed to operate at smoke temperatures of about 1800 to about 2000° F. It has been found that when a smoke stream at this temperature is introduced into a clean boiler a carbon black deposit forms quickly and adheres firmly to the heat exchange surfaces, thus resulting in an overall heat transfer coefficient of about 2 BTU/Hr.°F. Ft.$^2$ or lower within a short period of time, such as an hour. To overcome this problem, it has been found in accordance with the present invention that the overall heat transfer coefficient can be increased to about 3 to about 5 BTU/Hr.°F. Ft.$^2$ by a novel startup technique. Specifically, it has been found that, if the smoke to the heat exchanger is initially cooled to a temperature substantially below a predetermined temperature of introduction into the heat exchanger and the magnitude of quenching it is thereafter gradually reduced over a period of time until the smoke temperature is substantially equal to the predetermined temperature, the heat exchange surfaces will be preconditioned by forming a thin carbon black film on the heat exchange surfaces which essentially prevents further carbon black buildup. Consequently, it is believed that the hot smoke in essence "sees" a high temperature surface and the heat transfer coefficient is substantially improved.

The nature of the present invention will be better understood by reference to preferred embodiments when described in conjunction with the accompanying drawing.

In the drawing the numeral 10 designates carbon black furnace which may be any carbon black furnace of the prior art, for example, one as shown in U.S. Pat. Nos. 2,375,795; 2,564,700 or 3,869,870, which are incorporated herein by reference. Hydrocarbon reactants such as a hydrocarbonaceous feed stock (make oil) and/or gas, such as methane, are introduced axially through line 12. Cooling air, for the make oil feed nozzle, can be introduced through line 14. A fuel gas, a fuel oil or part of the make oil or gas can be introduced through line 16 together with combustion supporting air through line 18. The fuel and air produce hot combustion gases which are introduced into furnace 10, preferably in a tangential manner, to flow in a swirling motion about the axially moving hydrocarbon feed or reactant stream. Carbon black-containing effluent smoke is discharged from the furnace 10 through line 20. As previously indicated in the discussion of the background, the smoke being discharged from furnace 10 is quenched to terminate the reaction and at least partially cool the smoke to a temperature at which the smoke can be filtered to remove the carbon black therefrom. Such quenching can be accomplished by a variety of quenching media such as cooled recycle smoke, filter off gas or water. As previously indicated, U.S. Pat. No. 3,369,870 suggests preliminary cooling or quenching by means of cooled recycle smoke which can be introduced through line 22 and control valve 24. Alternatively, or in addition to the recycle smoke quench a regular quench may be performed by the introduction of water through line 26 and control valve 28. An auxiliary water quench can also be introduced through line 30 and control valve 32. While any one of the previously mentioned quench media or any combination thereof can be utilized, it is preferred, in accordance with the present invention, that water be used as a quenching medium. The water can be introduced either as a single stream through regular quench line 26 or sequentially through regular quench line 26 and then through auxiliary quench line 30.

In accordance with the start-up procedure forming one embodiment of the present invention, water can be introduced through line 26 at the rate necessary to reduce the temperature of the smoke to a predetermined temperature of introduction into steam boiler 34. Simultaneously, additional quench water may be initially introduced through line 30 to reduce the smoke temperature to a temperature substantially below the predetermined temperature. Thereafter, the volume of water supplied through line 30 is reduced over an extended period of time until such volume is essentially zero and the smoke is being quenched to a temperature substantially equal to the predetermined temperature by the quench water through line 26. Alternatively, a sufficient volume of water to quench the smoke to a temperature substantially below the predetermined temperature of introduction into steam boiler 34 may be introduced through regular quench line 26 and thereafter the volume of water through line 26 can be gradually reduced over an extended period of time until the temperature of the smoke is substantially equal to the predetermined temperature. Obviously, the same start-up procedure can be utilized with any quench medium, such as the recycle smoke, introduced through line 22 or recycle smoke in combination with water. The quenched smoke then passes through the interior of the tubes of steam boiler 34 and is discharged therefrom through line 36. The smoke passng through line 36 is then further cooled by means of a heat exchanger or a quench medium such as heat exchanger 38. Cooled smoke discharged from heat exchaner 38 is then passed through line 40 to a conventional carbon black recovery, such as bag filter means. Water is introduced to steam boiler 34 through line 42, controlled by valve 44. A suitable liquid level control means can be conventionally connected to valve 44. Steam produced by steam boiler 34 is discharged through line 46 and can be utilized in any one of the manners mentioned in the background discussion. In the operation, in accordance with the present invention, carbon black laden smoke from the furnace will initially have a temperature of about 2500° F. to about 2700° F. and usually about 2600° F. The waste heat boiler 34 is designed to operate on smoke entering at a predetermined temperature of about 1800 to 2000° F. Preliminary cooling, during the start-up method of the present invention, preferably reduces the temperature of the smoke to the waste heat boiler to a temperature below about 1000° F. This of course is accomplished by initially utilizing a larger volume of quench fluid than that necessary to quench and cool the smoke to the predetermined temperature. Thereafter, the volume of quench fluid is reduced, either intermittently or continuously, over an extended period of time until the smoke temperature increases to the predetermined temperature. It has been found that a desirable rate of increase of the smoke temperature is about 200° F. to about 2000° F. over a period of about 0.5 to about 5 hours. Preferably heatup would be at a rate of about 500° F. to about 2000° F./Hr. over a period of about 0.5 to about 2 hours. When the smoke temperature has reached the predetermined temperature for introduction into the waste heat boiler, the volume of quench fluid and hence the temperature of the smoke to the waste heat boiler is maintained substantially constant for normal operation of the carbon black production system.

A specific example will illustrate a typical operation in accordance with the present invention. In this example the quench medium utilized was water and was introduced through regular quench line 26 and auxiliary quench line 30. Fuel gas, comprising methane, was introduced through line 16 at a rate of about 13,300 SCF/Hr. Air to support combustion of the fuel gas was introduced through line 18 at a rate of about 200,000 SCF/Hr. Make oil at a rate of about 300 Gal./Hr. was introduced through line 12 and air was introduced axially through line 14 at a rate of about 4,000 SCF/Hr. Effluent smoke issuing from furnace 10 was at a temperature of about 2600° F. at point A. 200 Gal./Hr. of quench water was introduced through line 26. This introduction of quench water reduced the temperature at point B to about 2000° F. Initial cooling for start-up was accomplished by introducing 600 Gal./Hr. of water through auxiliary quench line 30. This was found to reduce the smoke temperature at point C, where it enters waste heat boiler 34, to about 1000° F. The quench water through auxiliary quench line 30 was then reduced at an incremental rate of about 150 Gal./15 Min. over a period of 1 hour until the quench water through auxiliary quench line 30 reached 0 Gal./Hr. This in turn increased the smoke temperature at point C by about 250° F./15 Min. during the 1 hour period. At the end of the 1 hour period the smoke temperature at point C was about 2000° F. or the predetermined operating temperature of introduction into waste heat boiler 34. Thereafter, production of carbon black was continued in its normal manner with the temperature of introduction of smoke into waste heat boiler 34 being mantained at about 2000°. The smoke temperature at point D as it left waste heat boiler 34 was about 1200° F. The smoke was further cooled in heat exchanger 38 to a temperature of about 400° F. for passage to the carbon black filter system. When operating in accordance with the present invention, it was found that during operation of the carbon black furnace following the novel start-up procedure the heat transfer coefficient was between about 3 and about 5 BTU/Hr.°F. Ft.$^2$. By contrast, in comparative tests, wherein the carbon black system was operated conventionally, i.e., beginning operation with the smoke to the waste heat boiler at a temperature of about 2000° F., the overall heat transfer coefficient was consistently about 2 BTU/Hr.°F. Ft.$^2$ or lower. It was also found that this low heat transfer coefficient was reached within the first hour or so of operation.

While specific examples, specific operating conditions and specific items of equipment have been referred to herein for illustrative purposes, it is to be understood that such are not to be considered limiting.

We claim:

1. A method for starting-up a carbon black production process, in which smoke produced by a carbon black furnace is quenched to terminate the reaction and is thereafter cooled, at least in part, by indirect heat exchange with water, comprising:
   (a) initially quenching said smoke with a quench fluid to a temperature substantially below a predetermined temperature of introduction into said heat exchange step said predetermined temperature being between about 1800° F. and about 2000° F.; and
   (b) reducing the magnitude of said quenching over an extended period of time until said smoke is being quenched to a temperature substantially equal to said predetermined temperature whereby the heat transfer coefficient of said smoke is improved.

2. A method in accordance with claim 1 wherein the reduction in the magnitude of the quenching is intermittent.

3. A method in accordance with claim 1 wherein the reduction in the magnitude of the quenching in continuous.

4. A method in accordance with claim 1 wherein a single stream of quench fluid is utilized.

5. A method in accordance with claim 1 wherein the smoke is initially simultaneously quenched with a first stream of quench fluid and thereafter with a second stream of quench fluid.

6. A method in accordance with claim 5 wherein the first stream of quench fluid is adapted to reduce the temperature of the smoke to a temperature substantially equal to the predetermined temperature and the second stream of quench fluid is adapted to initially reduce the temperature of the smoke to the temperature substantially below the predetermined temperature.

7. A method in accordance with claim 6 wherein the magnitude of the quenching by the second stream of quench fluid is reduced over an extended period of time until the temperature of the smoke increases to a temperature substantially equal to the predetermined temperature.

8. A method in accordance with claim 1 wherein the magnitude of the quenching is reduced by reducing the volume of quench fluid utilized.

9. A method in accordance with claim 1 wherein the smoke is initially quenched to a temperature below about 1000° F.

10. A method in accordance with claim 1 wherein the smoke is initially quenched to a temperature below about 1000° F. and the predetermined temperature is between about 1800° F. and about 2000° F.

11. A method in accordance with claim 10 or 11 wherein the magnitude of the quenching is reduced at a rate to permit the temperature of the smoke to increase at a rate of about 200°/Hr. to about 2000° F./Hr. until the predetermined temperature is reached.

12. A method in accordance with claim 6, 7 or 8 wherein the magnitude of the quenching is reduced over a period of about 0.5 to about 5 hours.

13. A method in accordance with claim 1 wherein the heat exchange step is carried out in a tube and shell heat exchanger.

14. A method in accordance with claim 13 wherein the smoke is passed through the tubes of the heat exchanger and water is introduced into the shell of said heat exchanger.

* * * * *